Nov. 2, 1965  S. G. NIELSEN ETAL  3,214,960
APPARATUS FOR CALIBRATING MEASURING INSTRUMENTS
Filed March 25, 1963  2 Sheets-Sheet 1

INVENTORS:
SVEND G. NIELSEN
WILLIAM G. ARNOLD
BY Howson & Howson
ATTYS.

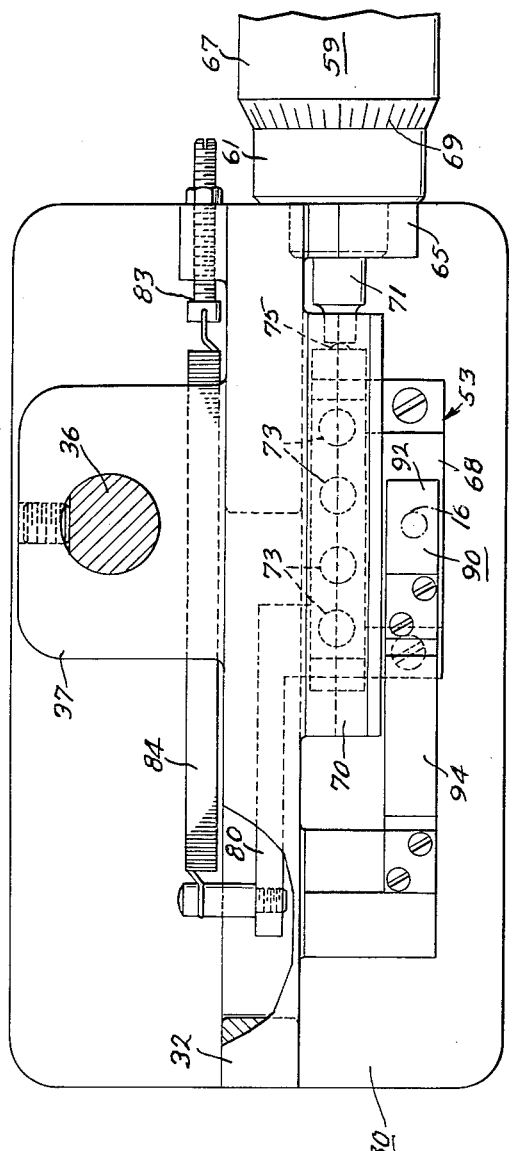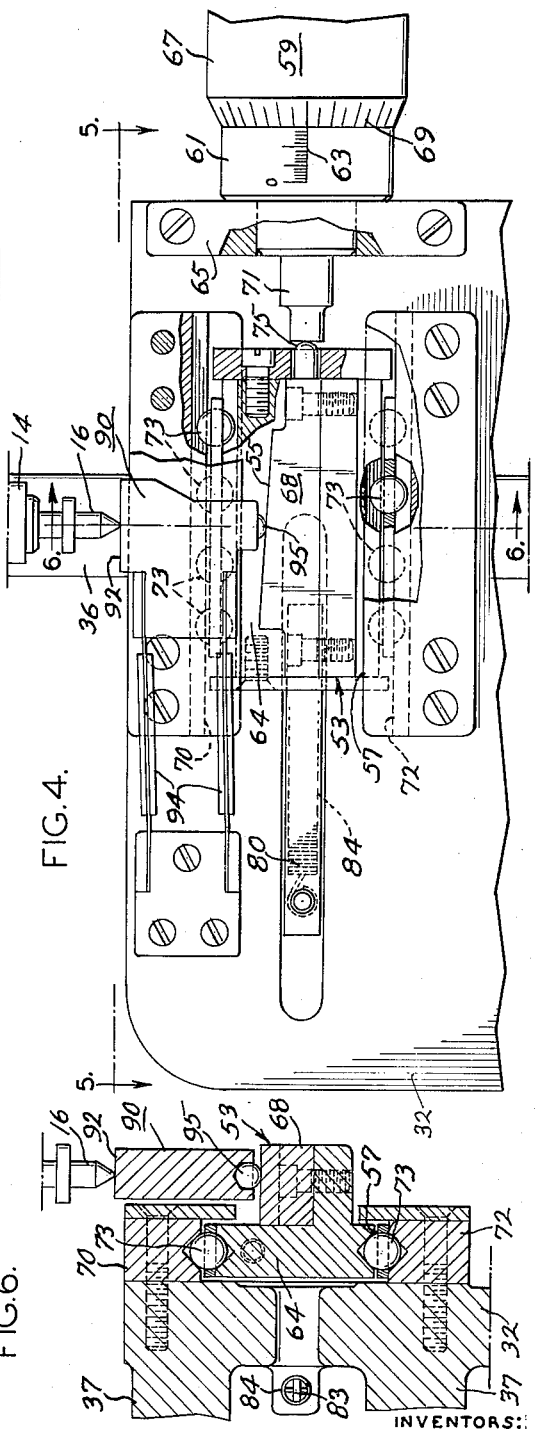

United States Patent Office 3,214,960
Patented Nov. 2, 1965

3,214,960
APPARATUS FOR CALIBRATING MEASURING
INSTRUMENTS
Svend G. Nielsen, Langhorne, and William G. Arnold, Lafayette Hills, Pa., assignors to SKF Industries, Inc., Philadelphia, Pa., a corporation of Delaware
Filed Mar. 25, 1963, Ser. No. 267,448
8 Claims. (Cl. 73—1)

The present invention relates to new and useful improvements in apparatus for calibrating measuring instruments and more particularly to calibrating apparatus characterized by novel features of construction and arrangement whereby the "linearity" and "repeatability" of a measuring instrument may be checked accurately and quickly.

The apparatus of the present invention is adapted for calibrating and/or recalibrating measuring instruments such as dial type indicators used to measure manufactured items for specified uniformity of size and contour. These dial indicator gauges usually include a gauge movement mounted in a casing or the like, a movable spindle connected to the gauge movement and projecting through the casing and an indicator or pointer connected to the gauge movement operable to traverse or sweep a graduated dial plate in response to and in a predetermined relation to displacement of the spindle. The "linearity" characteristic of a dial indicator gauge is satisfactory when the indicator registers accurately with each of the scale graduations on the dial plate for given displacements of the spindle and "repeatability" is the characteristic whereby the indicator or pointer registers with the scale graduations for repeated identical displacements of the spindle. Gauges of this type are usually checked after assembly and prior to use for "linearity" and "repeatability" to insure accuracy of measurement. Additionally due to the possibility of a change in gauge characteristics resulting from normal use and handling, the gauge should be recalibrated from time to time.

The present invention provides apparatus for calibrating and/or recalibrating measuring instruments such as dial indicators to insure proper "linearity" and "repeatability" characteristics. The apparatus includes a frame, a slide member having an inclined cam surface mounted on the frame for movement along a predetermined path, a comparison gauge having a movable element mounted on the frame and biasing means normally urging the slide member normally in one direction along its path of movement to engage and move with the movable element of the comparison gauge upon displacement thereof. The dial indicator to be calibrated is supported in a predetermined fixed position on the frame with its spindle positioned relative to the inclined cam surface of the slide member so that movement of the slide member by the movable element of the comparison gauge effects displacement of the spindle of the dial indicator. Thus by displacing the movable element of the comparison gauge over a given range, the slide member effects displacement of the spindle of the dial indicator and by comparing the position of the pointer of the dial indicator relative to the scale graduations, "linearity" of the dial indicator may be checked. If the pointer of the gauge being calibrated does not register precisely with the graduations in comparison with increments on the comparison gauge, the gauge movement is adjusted accordingly. Recalibration of a gauge necessitated by a change in gauge characteristics over a period of normal use is done in a similar manner. Periodically with the pointer of the dial indicator registering with a selected one of the scale graduations, the "repeatability" of the dial indicator may be tested by manually moving the slide member against the urging of the biasing means and then releasing it and noting if the pointer of the indicator registers again precisely with the selected scale graduation.

In the illustrated form of the invention, a transmitting member in the form of a block is disposed between the cam surface and the spindle of the dial indicator which is adapted for movement transversely to the direction of movement of the slide member and which includes planar surface substantially perpendicular to the axis of the spindle. By this arrangement the force displacing the spindle is axial thereby eliminating errors that might be introduced in the calibration of the dial indicator if the spindle directly contacted the cam surface whereby side thrusts would be imparted to the spindle during movement of the slide member. Further the planar surface perpendicular to the axis of the spindle facilitates visual observation from the front or side of the apparatus when seating the spindle so that it just contacts the planar surface at the start of the calibration operation.

With the foregoing in mind, an object of the present invention is to provide apparatus for calibrating and/or recalibrating measuring instruments characterized by novel features of construction and arrangement whereby the "linearity" and "repeatability" of the instrument may be gauged accurately and quickly.

Another object of the present invention is to provide apparatus for checking the "linearity" and "repeatability" of measuring instruments which is of comparatively simplified construction, is economical to manufacture and is extremely useful and accurate for the purposes intended.

Still another object of the present invention is to provide apparatus of the above type wherein the measuring instrument to be calibrated may be positioned accurately in the apparatus easily and quickly.

A further object of the present invention is to provide calibrating apparatus which may accommodate various types of commercially known measuring instruments.

These and other objects of the present invention and the various features and details of the operation and construction thereof are hereinafter more fully set forth with reference to the accompanying drawings, wherein:

FIG. 4 is an enlarged fragmentary side elevational view of a portion of the calibrating apparatus of the present invention;

Figure 1:
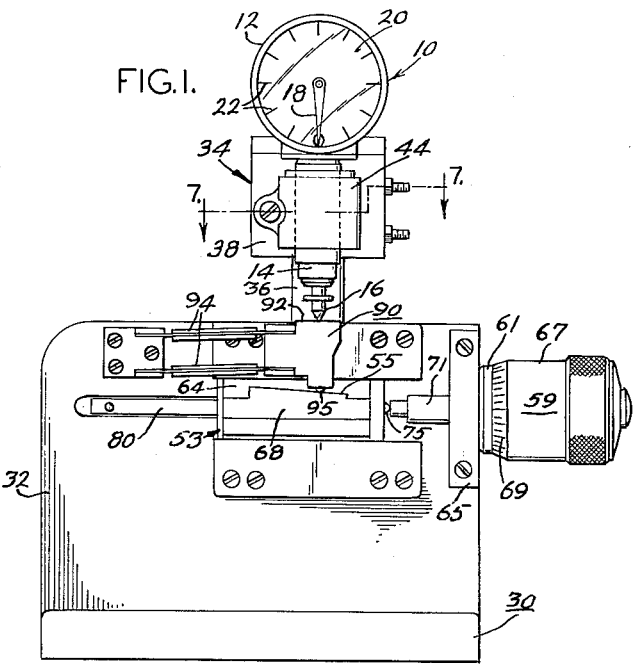
FIG. 1 is a side elevational view of apparatus for calibrating and/or recalibrating measuring instruments in accordance with the present invention.
Figure 7:
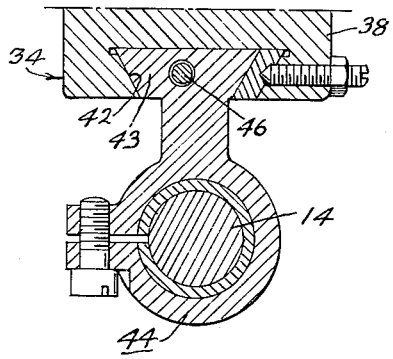

FIGS. 5 and 6 are sectional views taken on lines 5—5 and 6—6 respectively of FIG. 4; and FIG. 7 is an enlarged sectional view taken on line 7—7 of FIG. 1.

Referring now to the drawings, there is shown calibrating apparatus in accordance with the present invention adapted for checking the "linearity" and "repeatability" of a measuring instrument, such as a dial indicator 10. The dial indicator 10 illustrated comprises a casing or housing 12, a gauge movement (not shown) mounted in the housing, a tubular stem 14 depending from the housing which mounts therein a sensing element in the form of a spindle 16 connected to the gauge movement and adapted for reciprocating axial movement in the stem 14 and means for registering movement of the spindle including a pointer or indicator 18 connected to the gauge movement adapted for angular movement relative to a dial plate 20 in response to axial movement of the spindle 16 relative to the stem 14. As is customary, the dial plate 20 has a plurality of circumferentially spaced indicia 22 constituting major scale graduations of the gauge which increase incrementally circumferentially around the dial plate from a zero scale graduation with which the pointer 18 registers when the spindle 16 is fully extended.

Considering now the details and arrangement of the calibrating apparatus, the apparatus includes a frame comprising a generally rectangular base 30 and an upstanding web portion 32 projecting upwardly from the base and support means 34 for mounting the dial indicator 10 to be calibrated on the frame. In the present instance, the support means 34 comprises vertically spaced arms 37 which project laterally from the rear side face of the web 32 and which have openings therein to receive and support a post 36 and a support bracket 38 adjustably mounted on the upper end of the post 36 by set screws 40. A split collar member 44 releasably grips the stem 14 of the dial indicator 10 and which has a dove tail projection 43 engaging in a complementary dove tail slot 42 in the support bracket 38 so that the collar 44 may be adjusted in a vertical direction relative to the bracket 38 by means of a screw 46.

Means is provided for checking the "linearity" of the dial indicator 10 comprising in the present instance a slide member 53 having an inclined cam surface 55 adapted for movement along a predetermined path in a trackway 57. A comparison gauge 59 in the present instance, a conventional micrometer head consisting of a barrel 61 having the usual axially extending indicia 63 providing scale graduations fixed in a bracket 65 at one end of the web 32, a sleeve 67 having circumferentially extending indicia 69 cooperating with the graduations on the barrel 61 to measure displacement of a plunger 71 connected to the sleeve movable axially in the barrel 61. The plunger 71 is disposed for displacement in the direction of movement of the slide member 53 in the trackway 57 and the slide member 53 is adapted for movement with the plunger 71. By this arrangement the position of the pointer 18 of the dial indicator 10 due to displacement of the spindle 16 by the slide member 53 and plunger 71 may be compared with the amount of displacement of the plunger 71. Accordingly, by comparing the angular displacement of the pointer of the dial indicator 10 at selected intervals over its complete range in relation to corresponding readings on the comparison gauge, the linearity of the dial indicator 10 to be tested may be checked. In the present instance, the inclination of the cam surface 55 is such that the linear motion of the slide member 53 effected by the displacement of the plunger 71 causes a linear displacement of the spindle 16 of the dial indicator 10 to be tested equal to one-tenth of that of the plunger 71. This feature assures a great accuracy in vertical movement as it reduces any slight errors of the comparison gauge by ten and thus provides for an accurate check of the linearity of the dial indicator.

As illustrated, the slide member 53 comprises, in the present instance, a body portion 64 having a side face of generally rectangular shape, an elongated lug 66 projecting from the side face of the body portion 64 and formed integrally therewith providing a seat for a cam block 68, the upper surface of which is inclined to provide the cam surface 55. The block 68 mounts a pin-like bumper 75 at its forward end adapted to engage the axial end face of the plunger 71 of the comparison gauge. The trackway is formed by elongated block-like guide members 70 and 72 which are mounted in spaced apart relation on the front face of the web 32 and complementary V-shaped grooves are provided in the guide blocks 70, 72 and slide member 53 to accommodate roller bearing elements 73 to facilitate free movement of the slide member 53 in the trackway.

An important feature of the present invention is the provision of means for checking the "repeatability" of the dial indicator 10 to be tested. To this end the slide member 53 is mounted for free movement in the trackway 57 and is normally urged in a direction to engage the plunger 71 by biasing means. In the present instance, the biasing means is a coil spring 84 connected at one end to the free end of an arm 80 projecting from the body portion of the slide member and connected at its opposite end to an adjustable screw 83 mounted in a threaded bracket whereby the biasing or tensioning force of the spring 84 may be adjusted selectively. By this arrangement, during calibration of the gauge 10, with the pointer 18 in registry with a selected major scale graduation, the slide member may be moved manually in the trackway 57 against the bias of the spring 84 away from the plunger 71 of the comparison gauge whereby the pointer or indicator 18 is moved angularly due to the displacement of the spindle 16 and upon release of the slide member 53, it returns to abut the plunger 71 of the comparison gauge. If the pointer 18 again registers with the selected major scale graduation, the "repeatability" characteristic of the gauge is satisfactory.

Figure 2:
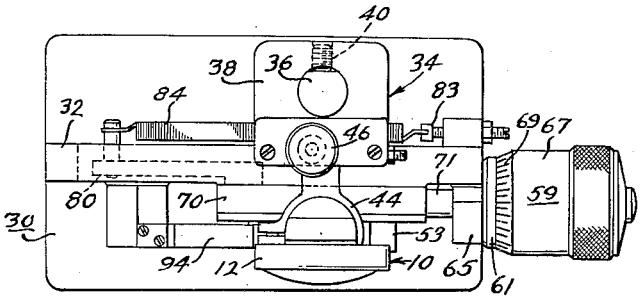
FIG. 2 is a plan view of the apparatus of the present invention.
Figure 3:
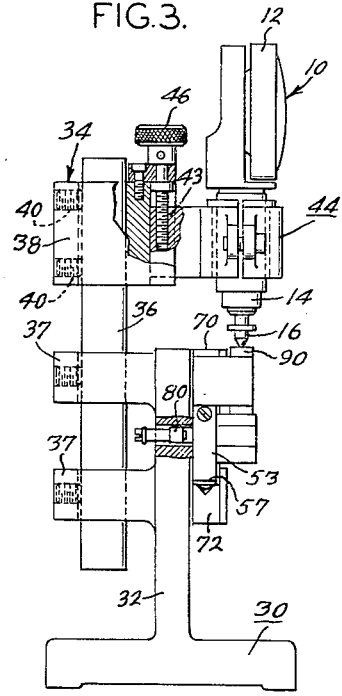
FIG. 3 is an end view of the apparatus with parts thereof broken away.

Another important feature of the present invention is the provision of a transmitting member between the spindle and the cam surface of the slide member movable in a direction substantially axially relative to the spindle upon back and forth movement of the slide member thereby minimizing side thrusts on the spindle during calibration of the gauge which might tend to affect the accuracy of the calibrating operation. In the present instance the transmitting member is in the form of a parallelogram head 90 having a planar surface 92 upon which the spindle 10 seats during calibration and which extends substantially perpendicular to the axis of the spindle and a roller support 95 providing a point contact with the cam surface 55. The parallelogram head 90 is mounted at one end of leaf springs 94 which are fixed at their opposite ends to a web 32 and are arranged to normally bias the parallelogram head 90 in engagement with the cam surface 55 for the full range of adjusting movement of the slide member 53. It is noted that by disposing the planar surface 92 perpendicular to the axis of the spindle 16, the spindle may be viewed from the front or the side of the apparatus as illustrated in FIGS. 1 and 3 to insure that the tip of the spindle 16 just contacts the planar surface at the start of the calibration operation.

In the use of the calibrating apparatus, the comparison gauge is adjusted so that the sleeve 67 is in the zero position whereby the plunger 71 is fully extended and the slide member 53 is in its extreme left hand limit position as shown in FIG. 1. The dial indicator 10 to be tested is then mounted in the bracket 34 which is adjusted on the post so that the point of the spindle 16 is spaced slightly from the surface 92 of the parallelogram head. Then by means of the fine adjustment screw 46, the split collar 38 is lowered until the point of the spindle 16 just contacts the surface 92. It is noted that since the contact surface 92 is substantially perpendicular to the axis of the spindle 16, the position of the tip of the spindle 16 relative to the surface 92 may be viewed easily from the side or front of the apparatus. The sleeve 67 of the comparison gauge then is rotated until the first major scale graduation on the barrel is exposed whereby the plunger 71 is retracted to the right and the spring biased slide member 53 moves a corresponding linear distance to the right. Accordingly the parallelogram head 90 is displaced upwardly whereby the spindle 16 is retracted in the stem 14 and the indicator 18 is moved an angular increment. At this reading on the comparison gauge, the pointer 18 should register precisely with the first major scale graduation on the dial plate. If the pointer 18 does not register precisely, the gauge movement is adjusted accordingly. With the pointer 18 registering precisely with the first major scale graduation, the slide member 53 is now moved manually to the left out of engagement with the plunger 71 against the bias of the spring 84 whereby the pointer 18 moves angularly from the first major scale graduation. The slide member 53 is then released whereby it abuts the plunger 71 and the pointer 18 is viewed to determine whether it re-registers with the first major scale graduation. If it does, then the "repeatability" characteristics is satisfactory. Thereafter, the sleeve of the comparison gauge is rotated to a new comparison position and this process is repeated until the pointer 18 has been moved through its entire range. Periodically the dial indicator is checked against the comparison gauge in the manner noted above, and adjusted if necessary. Further, the repeatability is also checked periodically.

Even though a particular type of measuring instrument has been illustrated in connection with the calibrating apparatus of the present invention, it is of course to be understood that other types of instruments may be calibrated thereon. For example, the calibration apparatus may be used to calibrate an air gauge having sensing means in the form of a nozzle adapted to discharge fluid under pressure and indicator means for measuring changes in the back pressure at the nozzle. In calibrating gauges of this type, the gauge is mounted on the frame so that the nozzle confronts the planar surface 92 of the parallelogram head whereby movement of the slide member 53 with the plunger 71 of the comparison gauge during calibration, results in changes in the back pressure at the nozzle. Changes in the back pressure at the nozzle effect movement of the indicator means of the air gauge which may be compared with the comparison gauge to check linearity thereof.

While a particular embodiment of the present invention has been illustrated and described herein, it is to be understood that changes and modifications may be made therein within the scope of the following claims.

We claim:

1. In apparatus for calibrating a measuring instrument having a movable sensing element and indicator means for registering movement of the sensing element, a frame, a slide member having an inclined cam surface mounted on said frame for movement along a predetermined path, a comparison gauge having a movable member mounted on said frame, means mounting said slide member for movement with said movable member of the comparison gauge, support means for mounting the measuring instrument on said frame with the sensing element positioned relative to said cam surface of the slide member to be displaced thereby upon movement of said slide member in a predetermined direction transverse to the direction of movement of said slide member, a transmitting member disposed between the movable sensing element of the measuring instrument and the slide member adapted for movement in said predetermined direction to displace the movable sensing element upon movement of the slide member along said predetermined path, and biasing means consisting of a spring parallelogram comprising a pair of leaf springs fixed at opposite terminal ends to the frame and transmitting member and normally urging said transmitting member in contact with said cam surface of said slide member for the full range of movement thereof.

2. Apparatus according to claim 1 wherein said cam surface is inclined toward said comparison gauge and has an angle of inclination such that movement of the spindle by displacement of the slide member with the movable member of the comparison gauge is approximately one-tenth the movement of the movable element of the measuring instrument.

3. Apparatus as claimed in claim 1 wherein said transmitting member includes a planar surface confronting the movable sensing element of the measuring instrument adapted to be engaged thereby and extending approximately perpendicular to the direction of movement of the sensing element.

4. Apparatus as claimed in claim 1 wherein said means normally urging said slide member in a direction along said path to engage and move with said movable member comprises a coil spring.

5. Apparatus as claimed in claim 1 wherein said support means comprises a bracket and including means for adjusting the bracket relative to the frame whereby the sensing element may be disposed in a predetermined position relative to the transmitting member at the start of the calibration operation.

6. Apparatus as claimed in claim 1 wherein said slide member comprises a portion having a side face of generally rectangular shape, an elongated lug projecting from the side face of the body portion providing a seat for a cam block, a portion of said cam block defining the inclined cam surface, a guide arm projecting from the opposite side face of the body portion engaging in a slot in the frame and including a coil spring connected to said arm and said frame for effecting movement of said slide member with said movable member of the comparison gauge.

7. Apparatus as claimed in claim 6 including a pin-like bumper at one end of said body portion adapted to engage the axial end face of a plunger of the comparison gauge.

8. In apparatus for calibrating a measuring instrument having a movable sensing element and indicator means for registering movement of the sensing element, a frame, a slide member having an inclined cam surface mounted in a trackway on said frame for movement along a predetermined path, said trackway defined by a pair of spaced apart block-like guide members mounted on said frame having complementary confronting V-shaped grooves, portions of said slide member confronting said V-shaped grooves in said guide blocks being provided with elongated grooves to receive roller bearing elements facilitating free movement of the slide member in the trackway, a comparison gauge having a movable member mounted on said frame, means mounting said slide member for movement with said movable member of the comparison gauge, support means for mounting the measuring instrument on said frame with the sensing element positioned relative to said cam surface of the slide member to be displaced thereby upon movement of said slide member in a predetermined direction transverse to the direction of movement of said slide member, a transmitting member disposed between the movable sensing element of the measuring instrument and the slide member adapted for movement in said predetermined direction to displace the movable sensing element upon movement of the slide member along said predetermined path, first biasing means normally urging said transmitting member in contact with said cam surface of said slide member for the full range of movement thereof, said first biasing means consisting of a spring parallelogram comprising a pair of leaf springs fixed at opposite terminal ends to the frame and transmitting member and normally urging said transmitting member in contact with said cam surface of said slide member for the full range of movement thereof.

References Cited by the Examiner

UNITED STATES PATENTS 2,329,828  9/43  Clark _____ 73—1
2,421,440  6/47  Thorpe _____ 33—165

FOREIGN PATENTS 759,150  10/56  Great Britain.

LOUIS R. PRINCE, *Primary Examiner.*